(12) United States Patent
Primos

(10) Patent No.: US 7,784,213 B1
(45) Date of Patent: Aug. 31, 2010

(54) TURKEY DECOY APPARATUS

(75) Inventor: Wilbur R. Primos, Madison, MS (US)

(73) Assignee: Primos, Inc., Flora, MS (US)

( * ) Notice: Subject to any disclaimer, the term of this patent is extended or adjusted under 35 U.S.C. 154(b) by 655 days.

(21) Appl. No.: 11/767,396

(22) Filed: Jun. 22, 2007

(51) Int. Cl.
*A01M 31/06* (2006.01)
(52) U.S. Cl. .......................................................... 43/2
(58) Field of Classification Search ................. 43/2, 43/3
See application file for complete search history.

(56) References Cited

U.S. PATENT DOCUMENTS

| | | | | |
|---|---|---|---|---|
| 2,201,246 | A * | 5/1940 | Sells | 473/580 |
| 4,325,996 | A * | 4/1982 | Krietemeier et al. | 428/16 |
| 4,590,699 | A | 5/1986 | Nicks | |
| 4,965,953 | A | 10/1990 | McKinney | |
| 5,064,725 | A * | 11/1991 | Acker | 428/542.4 |
| 5,168,649 | A | 12/1992 | Wright | |
| 5,199,204 | A | 4/1993 | Lowery | |
| 5,437,935 | A * | 8/1995 | Fredeen | 428/542.4 |
| 5,660,220 | A * | 8/1997 | Ruan | 160/84.07 |
| 5,682,702 | A | 11/1997 | McKnight et al. | |
| D398,697 | S | 9/1998 | Scordo | |
| 6,070,356 | A | 6/2000 | Brint et al. | |
| 6,210,251 | B1 * | 4/2001 | Primos et al. | 446/397 |
| 6,216,382 | B1 | 4/2001 | Lindaman | |
| 6,487,810 | B1 | 12/2002 | Loughman | |
| 6,560,894 | B2 * | 5/2003 | Leber | 34/280 |
| 6,658,782 | B2 | 12/2003 | Brint | |
| 6,684,552 | B1 | 2/2004 | Anders, III | |
| 6,708,440 | B2 | 3/2004 | Summers et al. | |
| 6,773,768 | B2 | 8/2004 | Weiser | |
| 6,775,943 | B2 | 8/2004 | Loughman | |
| 6,843,702 | B2 | 1/2005 | Weiser | |
| 7,090,557 | B1 * | 8/2006 | Ainsworth et al. | 446/487 |
| 7,231,737 | B2 * | 6/2007 | Bradford | 43/2 |
| 7,627,977 | B2 * | 12/2009 | Denny | 43/2 |
| 2004/0250461 | A1 * | 12/2004 | Dryer | 43/2 |
| 2007/0151139 | A1 * | 7/2007 | O'Dell | 43/2 |

OTHER PUBLICATIONS

Internet advertisement, "The Pretty Boy and Pretty Girl," by Carry-Lite Hunting Decoys, date unknown.
Internet advertisement, "Turkey Decoy," by Carry-Lite Hunting Decoys, date unknown.
Cabela's internet advertisement, "Montana Strutting Tom Turkey Decoy," by Jerry McPherson's Montana Decoy, Inc., date unknown.

(Continued)

*Primary Examiner*—Kimberly S Smith
(74) *Attorney, Agent, or Firm*—Holland & Hart

(57) ABSTRACT

An apparatus may include a turkey decoy device with a collapsible fan holder. The collapsible fan holder may include a first section comprising a first plurality of feather retainers, a second section comprising a second plurality of feather retainers, and a first hinge attaching the first section to the second section. A fan holder with first and second feather retainers is also disclosed. The first feather retainer may be dimensioned to secure a first turkey feather to the fan holder, and the second feather retainer may be dimensioned to secure a second turkey feather to the fan holder. The first feather retainer may have a greater depth dimension than width dimension. A turkey decoy apparatus that includes a turkey decoy body is also disclosed.

5 Claims, 11 Drawing Sheets

OTHER PUBLICATIONS

Cabela's internet advertisement, "2nd Generation Struttin' Tom," by Sceery Outdoors, date unknown.

Internet advertisement, "Feather Flex 'Tommy' Full Strut Turkey Hunting Jake Decoy," by Wing Supply, date unknown.

Cabela's internet advertisement, "Jakester Strutting Fantail Decoy," by Flambeau Outdoors, date unknown.

Internet advertisement, "TransFan," by Hunter's Edge, date unknown.

Cabela's internet advertisement, "The Real Tail Turkey Decoy Add-on," date unknown.

Cabela's internet advertisement, "Renzo's Backside Struttin' Jake Turkey Decoy," date unknown.

* cited by examiner

TURKEY DECOY APPARATUS

BACKGROUND

During turkey mating season, male turkeys (gobblers) may court female turkeys (hens). In a courting ritual, a gobbler will often puff out his feathers, spread out and raise his tail feathers, and drag his wings on the ground. This behavior is sometimes referred to as strutting, and is a gobbler's attempt to attract hens and display dominance to other male turkeys in the area. Gobblers are often defensive of their mating territory, and they may confront and attack an intruding gobbler, particularly if the intruding gobbler is strutting.

Hunters often use turkey decoys to attract gobblers to come within shooting range. A gobbler decoy may draw a real gobbler in to protect his territory, and a strutting decoy may be a very effective type of decoy in these situations. To be effective, a strutting decoy should look realistic. One disadvantage of some turkey decoys is that they do not look realistic. Another disadvantage of many turkey decoys is that they are large, bulky, and difficult to carry in the field while hunting.

SUMMARY

According to certain embodiments, an apparatus may comprise a turkey decoy device. The turkey decoy device may comprise a collapsible fan holder, and the collapsible fan holder may comprise a first section. The first section may comprise a first plurality of feather retainers. The collapsible fan holder may also comprise a second section, and the second section may comprise a second plurality of feather retainers. The collapsible fan holder may also comprise a first hinge that attaches to the second section.

In at least one embodiment, a collapsible fan holder may further comprise a third section. The third section may comprise a third plurality of feather retainers. A collapsible fan holder may also comprise a second hinge that attaches a third section to the second section, and the second hinge may be configured to allow a front side of the third section to fold toward a front side of the second section. Also, the first hinge may be configured to allow a back side of the first section to fold toward a back side of the second section.

In at least one embodiment, the collapsible fan holder may further comprise a fourth section. The fourth section may comprise a fourth plurality of feather retainers. The collapsible fan holder may also comprise a third hinge that attaches a fourth section to the third section, and the third hinge may be configured to allow a back side of the fourth section to fold toward a back side of the third section. According to some embodiments, the collapsible fan holder may be dimensioned to fold into a collapsed position with the back side of the first section contacting the back side of the second section, the front side of the second section contacting the front side of the third section, and the back side of third section contacting the back side of the fourth section.

In some embodiments, the apparatus may comprise a resilient retaining member that is configured to hold the collapsible fan holder in the collapsed position. The collapsible fan holder may comprise a first tab extending from the first section and a second tab extending from the fourth section. The first and second tabs may be dimensioned to hold a resilient retaining member in place around the collapsible fan holder. According to various embodiments, each of the first, second, third, and fourth sections may be generally triangular shaped. The collapsible fan holder may also be generally triangular shaped in a collapsed position, and the collapsible fan holder may be semi-circle shaped in an open position. In some embodiments, each of the first, second, third, and fourth sections may comprise four feather retainers.

In at least one embodiment, the apparatus may further comprise a washer dimensioned to hold the collapsible fan holder in an open position. The apparatus may also comprise a fastener configured to attach the collapsible fan and the washer to a turkey decoy body. In some embodiments, the collapsible fan holder may comprise an opening between the first and second sections, and the opening may be dimensioned to allow the collapsible fan holder to be attached to and detached from the turkey decoy body without disassembling the fastener. According to various embodiments, the fastener may be configured to adjust between a first position and a second position. The fastener may also be configured to hold the collapsible fan holder upright in the first position. The fastener may be configured to allow the collapsible fan holder to angle away from the turkey decoy body in the second position.

According to certain embodiments, an apparatus may comprise a turkey decoy device that includes a fan holder. The fan holder may comprise a first feather retainer dimensioned to secure a first turkey feather to the fan holder. The first feather retainer may have a greater depth dimension than width dimension, and the depth and width dimensions of the first feather retainer may be configured to guide the first turkey feather into the fan holder such that a vane of the first turkey feather faces a first direction. The fan holder may also comprise a second feather retainer dimensioned to secure a second turkey feather to the fan holder. The second feather retainer may have a greater depth dimension than width dimension, and the depth and width dimensions of the second feather retainer may be configured to guide the second turkey feather into the fan holder such that a vane of the second turkey feather faces the first direction.

In various embodiments, the first feather retainer may comprise an opening dimensioned to receive a quill of the first feather and a clip dimensioned to guide the quill of the first feather into the opening such that the vane of the first feather faces the first direction. According to at least one embodiment, the fan holder may further comprise a plurality of feather retainers, and the plurality of feather retainers may comprise the first and second feather retainers. In some embodiments, the plurality of feather retainers may comprise between 14 and 20 feather retainers, and the fan holder may be semi-circle shaped.

According to certain embodiments, a turkey decoy apparatus may comprise a turkey decoy body. The turkey decoy apparatus may also comprise a collapsible fan holder, and the collapsible fan holder may comprise a first section. The first section may comprise a plurality of feather retainers. The collapsible fan holder may also comprise a second section. The second section may comprise a second plurality of feather retainers. The collapsible fan holder may comprise a first hinge that attaches the first section to the second section. The turkey decoy apparatus may comprise a fastener that attaches the fan holder to the turkey decoy body.

In some embodiments, the turkey decoy apparatus may further comprise a support stand attached to the turkey decoy body. The support stand may comprise an upper stand section, and the upper stand section may have a height that is less than a height of the turkey decoy body. The support stand may also comprise a lower stand section, and the lower stand section may be detachable from the upper stand section. According to various embodiments, the turkey decoy body may comprise a breast section, a tail section, left and right wing sections, and an opening extending from the left wing section to the right wing section. The opening may extend from the breast section to the tail section. In various embodiments, the turkey decoy apparatus may comprise a support stand that is attached to a top portion of the turkey decoy body. The support stand may be configured to contact only the top portion of the turkey decoy body when the turkey decoy body is resting on the support stand in an upright position.

According to certain embodiments, a turkey decoy apparatus may comprise a turkey decoy body and a feather assembly. The turkey decoy apparatus may also comprise a fastener that attaches the feather assembly to the turkey decoy body, and the fastener may be adjustable to allow the feather assembly to be laid back at multiple angles relative to the turkey decoy body. In at least one embodiment, the feather assembly may comprise a collapsible fan holder. The collapsible fan holder may comprise a first section with a first plurality of feather retainers, a second section with a second plurality of feather retainers, and a first hinge that attaches the first section to the second section.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are part of the specification. Together with the following description these drawings demonstrate and explain various principles of the instant disclosure.

DETAILED DESCRIPTION

Figure 1:
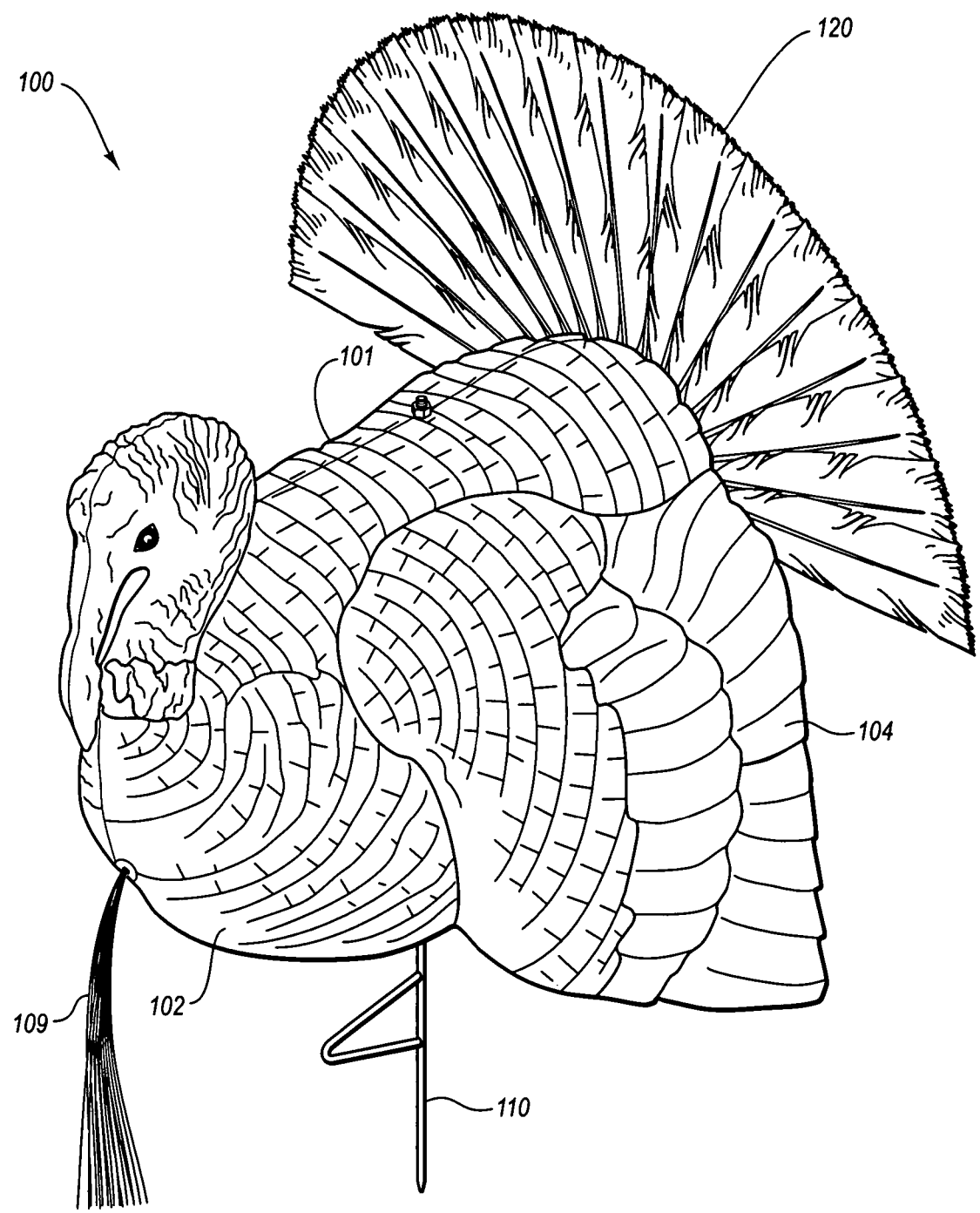
FIG. 1 is a perspective view of an exemplary turkey decoy according to certain embodiments.

Throughout the drawings, identical reference characters and descriptions indicate similar, but not necessarily identical, elements. While embodiments of the instant disclosure are susceptible to various modifications and alternative forms, specific embodiments have been shown by way of example in the drawings and will be described in detail herein. However, one of skill in the art will understand that embodiments of the instant disclosure are not intended to be limited to the particular forms disclosed herein. Rather, the instant disclosure covers all modifications, equivalents, and alternatives falling within the scope of embodiments defined by the appended claims.

The turkey decoys illustrated and described herein may provide various advantages. For example, according to some embodiments, a turkey decoy may be portable and realistic in appearance. In certain embodiments, turkey decoys may include collapsible parts, including a collapsible body and a collapsible fan holder. Turkey decoy devices discussed herein may also provide various other features and advantages.

FIG. 1 is a perspective view of a turkey decoy 100. Turkey decoy 100 may be a gobbler (i.e., a male turkey, which could be a mature male (a tom) or an immature male (a jake) in full strut with a spread-out fan 120. According to some embodiments, turkey decoy 100 may not necessarily be a strutting decoy (e.g., fan 120 may not be fully spread, feathers may not be puffed out, etc). A body 101 of turkey decoy 100 may include a breast section 102 and a left wing section 104. Turkey decoy 100 may also include a beard 109 and a support stand 110.

As illustrated in FIG. 1, turkey decoy 100 may be designed to have aspects that simulate the appearance of a real wild turkey. Turkey decoy body 101 may be made of a synthetic material (e.g., plastic, metal, or any other suitable material. In some embodiments, turkey decoy body 101 may be made of a resilient synthetic material that allows turkey decoy body 101 to be collapsed to increase its portability. According to at least one embodiment, turkey decoy body 101 may be made of a light-weight material.

Fan 120 may be included at a tail section of body 101. In some embodiments, fan 120 may be an integral part of body 101. In other embodiments, fan 120 may be a separate attachment for turkey decoy 100. Fan 120 may be made of silk, plastic, or any other suitable fabric or material. In some embodiments, as shown in FIGS. 8A, 8B, 8C, 9, and 10, fan 120 may include real turkey tail feathers.

Figure 2:
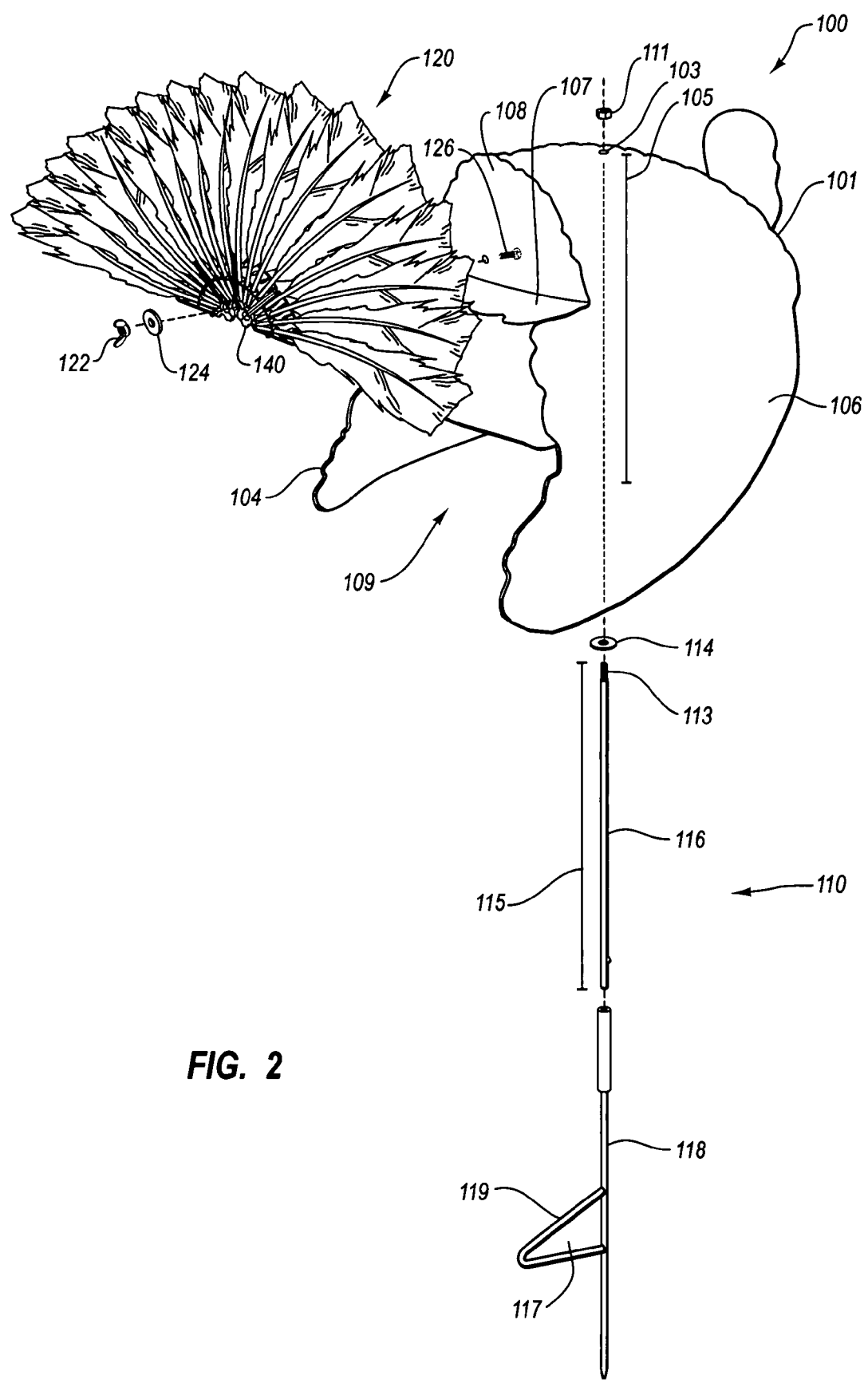
FIG. 2 is an exploded view of the exemplary turkey decoy illustrated in FIG. 1.

FIG. 2 is an exploded view of turkey decoy 100. As illustrated in FIG. 2, turkey decoy body 101 may include a tail section 108, a right wing section 106, and left wing section 104. Turkey decoy body 101 may also include an opening 109. According to some embodiments, opening 109 may extend throughout turkey decoy body 101 (e.g., compress, turkey decoy body 101 may be hollow). Opening 109 may extend from left wing section 104 to right wing section 106, and from breast section 102 to tail section 108. Opening 109 may allow a user to collapse turkey decoy 100 to a smaller, more portable size. For example, body 101 may be made of a resilient synthetic material that allows a user to collapse (e.g., roll, fold, and/or bend) body 101 into a compact shape for storage and/or transport. According to some embodiments, body 101 may be made of a material that can quickly return to the shape of a turkey after being collapsed.

Tail section 108 of turkey decoy body 101 may comprise a shelf 107. Shelf 107 may help fan section 120 be placed in a proper orientation relative to the rest of turkey decoy 100. Shelf 107 may also help turkey decoy body 101 regain and maintain its original shape after being collapsed.

FIG. 2 illustrates that support stand 110 is attached to a top portion of turkey decoy body 101. Support stand 110 may also be referred to as a stake. Support stand 110 may include a lower stand section 118 and an upper stand section 116. A threaded portion 113 of upper stand section 116 may pass through a hole 103 in turkey decoy body 101. Upper stand section 116 may be secured to turkey decoy body 101 with a washer 114 and a bolt 111.

A height 115 of upper stand section 116 may be less than a height 105 of turkey decoy body 101, and lower stand section 118 may be detachable from upper stand section 116. Such a design of support stand 110 may allow for collapsibility and quick set-up/take-down of turkey decoy 100. For example, lower stand section 118 may be quickly detached from upper stand section 116, and turkey decoy body 101 may be folded up or rolled around upper stand section 116. Thus, turkey decoy 100 may be collapsed to a compact form without completely removing support stand 110. Furthermore, when a user wants to set up turkey decoy 100, the user will not have to reattach the entire support stand to turkey decoy body 101; instead, the user may only need to reconnect lower stand section 118 to upper stand section 116. In some embodiments, a user may collapse and transport turkey decoy 100 without removing lower stand section 118. In at least one embodiment, support stand 110 may only include a single section. In other embodiments, support stand 110 may include more than two sections.

Support stand 110 may also include an extension 119. A user may step on extension 119 to drive support stand 110 into the ground. Extension 119 may be particularly useful in setting up turkey decoy 100 in hard or rocky soil. Extension 119 may also include an opening 117 that may allow a user to grip extension 119 when trying to pull support stand 110 from the ground.

As shown in FIG. 2, support stand 110 may only attach to turkey decoy body 101 at a single location at the top of turkey decoy body. The single point of connection between support stand 110 and turkey decoy body 101, along with opening 109, may allow turkey decoy body 101 to rotate, sway, tilt, and/or wobble about support stand 110. For example, turkey decoy body 100 may sway in the wind or tilt when being attacked by a real gobbler. Such movements may enhance the realism of turkey decoy 100. In other embodiments, turkey decoy body 101 may be secured to support stand 110 in a manner than prevents movement of turkey decoy body 101.

As previously noted, turkey decoy 100 may include a fan 120. According to various embodiments, fan 120 may include real or synthetic feathers inserted into a collapsible fan holder 140. Fan 120 may be attached to turkey decoy body 101 with a wing nut 122 and a bolt 126. Any other suitable fastener may also be used to attach fan 120 to turkey decoy body 101. In certain embodiments, a washer 124 may be secured to collapsible fan holder 140 to hold collapsible fan holder 140 in an open position.

Figure 3:
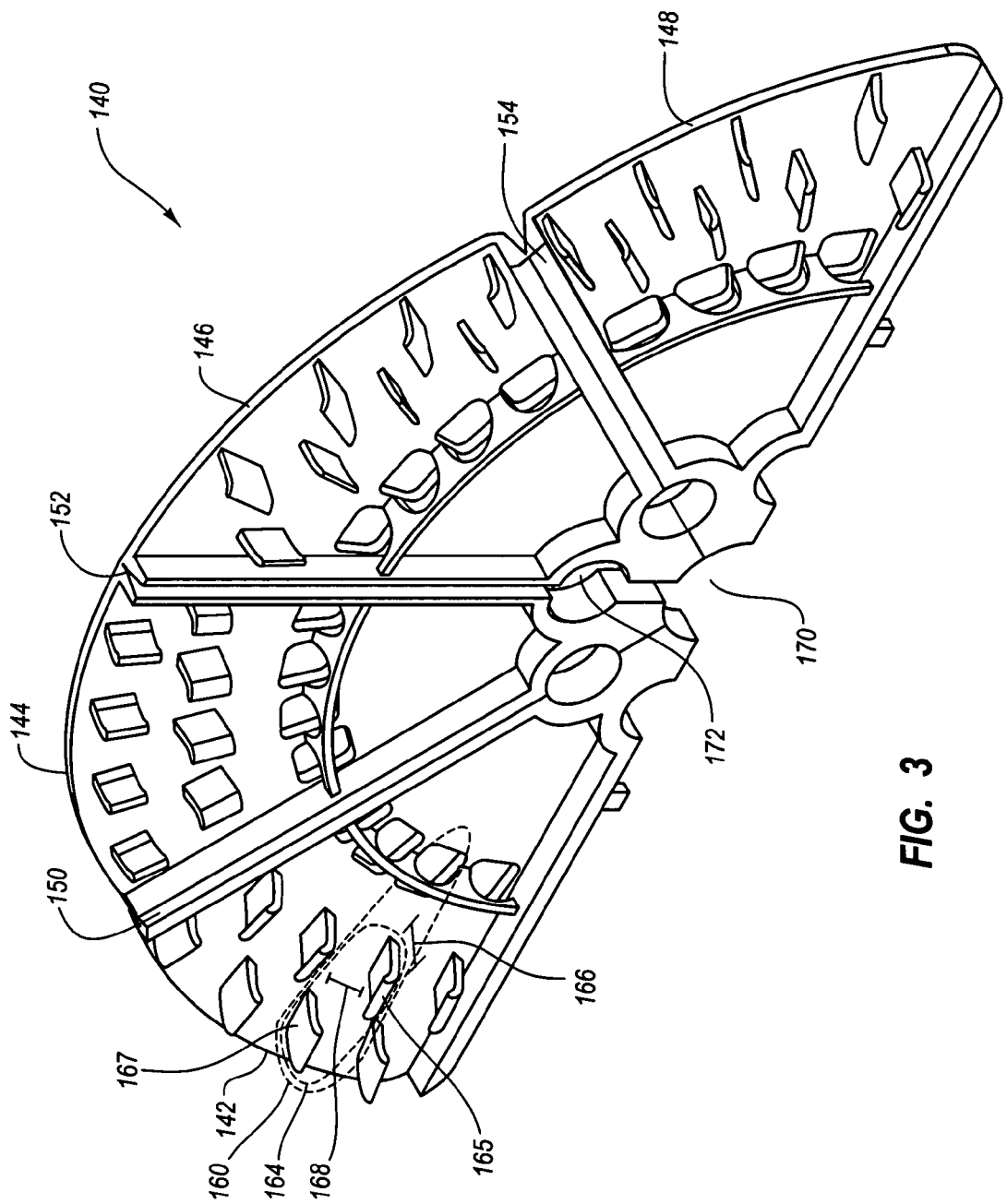
FIG. 3 is a perspective view of an exemplary collapsible fan holder for a turkey decoy according to certain embodiments.

FIG. 3 is a perspective view of a back side of collapsible fan holder 140. Collapsible fan holder 140 may include an opening 170 and an opening 172. A user may pass a bolt or any other suitable attachment device through either opening 170 or opening 172 to secure collapsible fan holder 140 to turkey decoy body 101. Collapsible fan holder 140 may also include a first section 142, a second section 144, a third section 146, and a fourth section 148. First section 142 may be attached to second section 144 with a hinge 150. Second section 144 may be attached to third section 146 with a hinge 152, and third section 146 may be attached to fourth section 148 with a hinge 154. According to some embodiments, hinges 150, 152, and 154 may be so-called living hinges, or thing sections of relatively flexible plastic. Hinges 150, 152, and 154 may also comprise any other type of suitable hinge.

First section 142 may include a feather retainer 160. According to some embodiments, each of first section 142, second section 144, third section 146, and fourth section 148 may include a plurality of feather retainers. In some embodiments, each section of collapsible fan holder 140 may comprise four feather retainers. In other embodiments, each section of collapsible fan holder 140 may comprise any suitable number of feather retainers, including more or less than four feather retainers. Also, one or more of the sections of collapsible fan holder 140 may comprise a different number of feather retainers than another section. In some embodiments, one or more feather retaining sections may combine to form a combined feather retainer of approximately 180°.

According to some embodiments, feather retainer 160 may comprise an opening 162 and a clip 164. Opening 162 and clip 164 may be dimensioned to receive a quill of a feather. Clip 164 may include a first side 165 and a second side 167. In other embodiments, clip 164 may be a continuous loop, similar to opening 162. According to at least one embodiment, feather retainers may be single openings or clips rather than including both clips and openings. A feather retainer may also include any other suitable retaining structure or structures (e.g., a clamp, a clasp, a hook).

FIG. 3 illustrates that side 167 of clip 164 may be offset relative to side 165 such that sides 167 and 165 are not directly opposite one another. A clip with offset sides, such as clip 164, may allow a user to more easily insert feathers into collapsible fan holder 140. For example, tail feathers from a real turkey may have quills of slightly different sizes, and a clip with offset sides may be able to accommodate these different quill sizes.

Figure 4:
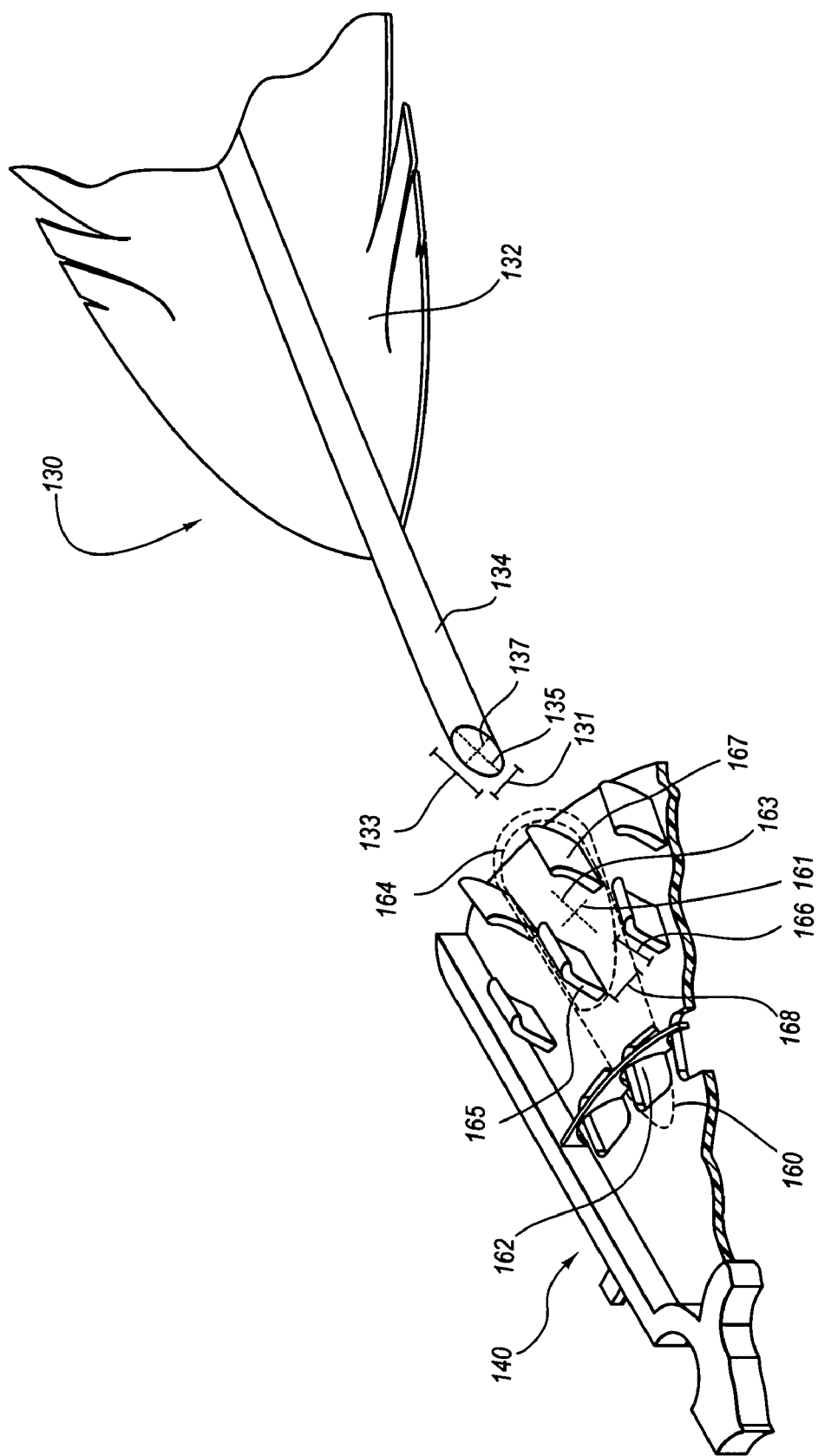
FIG. 4 is a perspective view of a feather being inserted into a collapsible fan holder according to certain embodiments.

FIG. 4 shows that clip 164 may be dimensioned to guide a quill 134 of a feather 130 into feather retainer 160 such that a vane 132 of feather 130 faces a forward direction relative to collapsible fan holder 140. Quill 134 may have a greater depth 133 than width 131. The width of a feather's quill may be the dimension of the quill that extends in the same direction or plane that a vane extends from the shaft of the feather. The depth of the quill may be perpendicular to the width. In certain embodiments, a feather retainer may be dimensioned to take advantage of this relationship between the dimensions of a quill and the direction of the vane. For example, clip 164 of feather retainer 160 may have a greater depth 166 than width 168, which may help guide feather 130 into feather retainer 160 in the proper orientation.

Figure 8A:
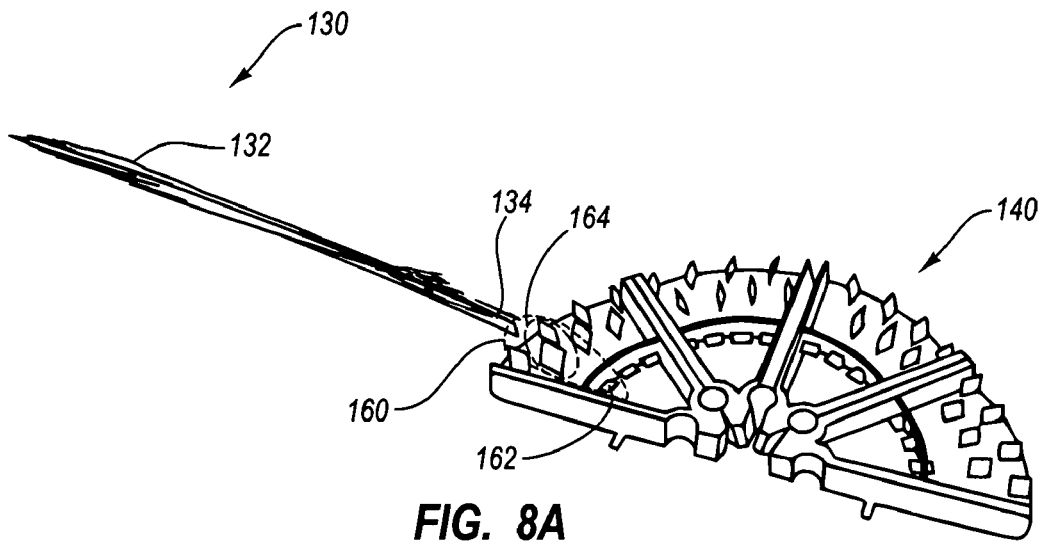
FIGS. 8A, 8B, and 8C illustrate inserting a feather into an exemplary collapsible fan holder according to certain embodiments.
Figure 8B:
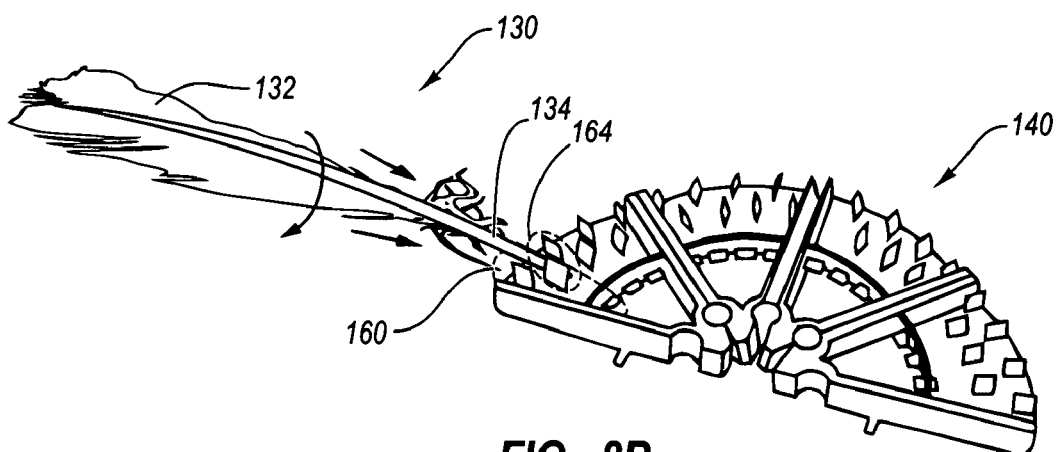
Figure 8C:
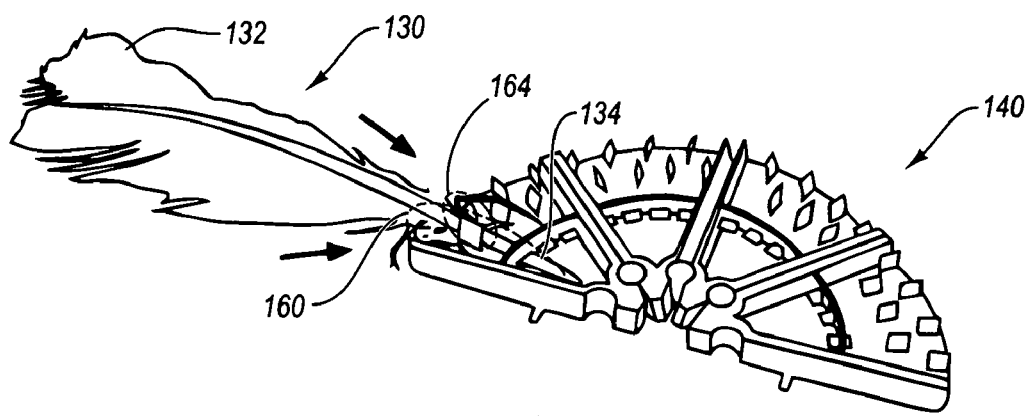

As a user inserts quill 134 into clip 164, clip 164 may cause feather 130 to rotate until a depth axis 135 and a width axis 137 of feather 130 substantially align with a depth axis 163 and a width axis 161 of clip 164. FIGS. 8A, 8B, and 8C provide another example of how a feather may be inserted into a collapsible fan holder.

A height 166 of clip 164 may be approximately one-fourth of an inch and a width 168 of clip 164 may be approximately three-sixteenths of an inch. Thus, a width-to-height ratio of claim 164 may be approximately 0.75. According to various embodiments, clip 164 may have any suitable height, including heights greater and less than one-fourth of an inch. Similarly, clip 164 may have any suitable width, including widths greater or less than three-sixteenths of an inch. Thus, a width-to-height ratio of clip 164 may be any suitable ratio.

Figure 5:
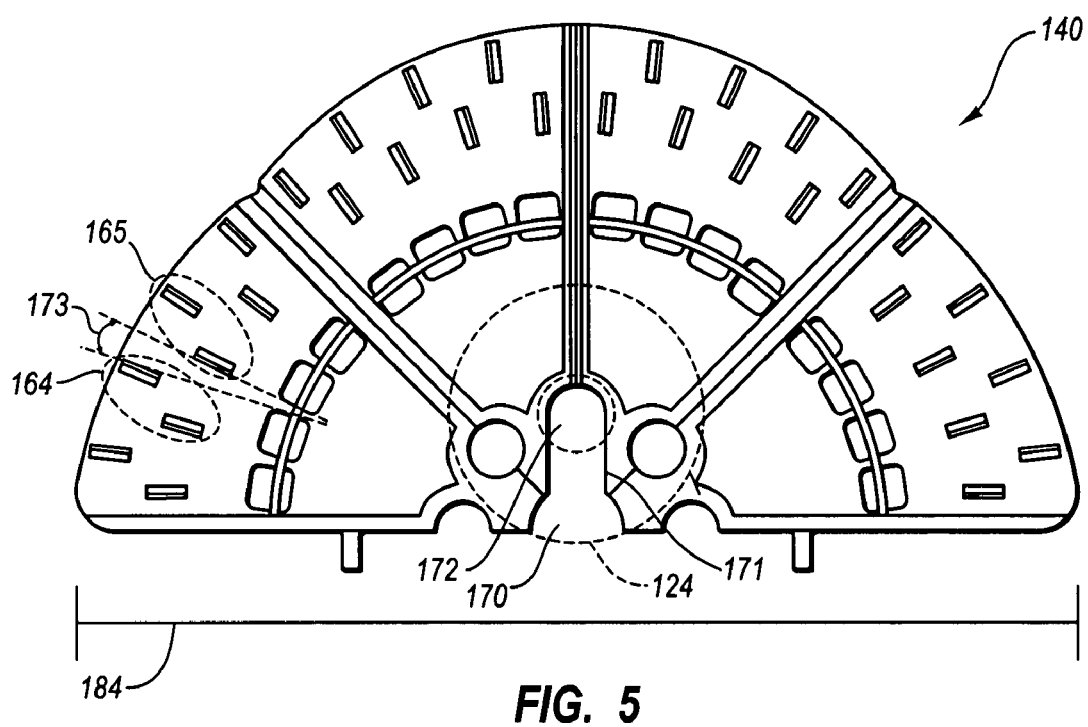
FIG. 5 is back view of the exemplary collapsible fan holder illustrated in FIG. 3.

FIG. 5 is a back view of collapsible fan holder 140. As shown in FIG. 5, a distance 172 between clip 164 and a clip 165 may be approximately one-eighth of an inch. In some embodiments, distance 172 may be any suitable length, including lengths of greater or less than one-eighth of an inch. Clips 164 and 165, as well as other clips in collapsible fan holder 140, may be spaced to separate feathers such that the fan looks like a realistic gobbler fan.

Collapsible fan holder 140 may also include a washer 124. Washer 124 may be placed against a back side of collapsible fan holder 140 to keep collapsible fan holder 140 in an open position. In some embodiments, a second washer may be placed against a front side of collapsible fan holder 140. In other embodiments, collapsible fan holder 140 may be secured to turkey decoy 100 without using any washers.

Collapsible fan holder 140 may be any suitable shape. For example, collapsible fan holder 140 may be semi-circle shaped in an open position, as shown in FIG. 5. Each of the first, second, third, and fourth sections, 142, 144, 146, and 148 may be triangular shaped. Thus, in a collapsed position, collapsible fan holder 140 may also have a generally triangular shape. A diameter 184 of collapsible fan holder 140 may be approximately five inches. According to some embodiments, diameter 184 may be any suitable length, including lengths of greater or less than five inches.

Figure 6:
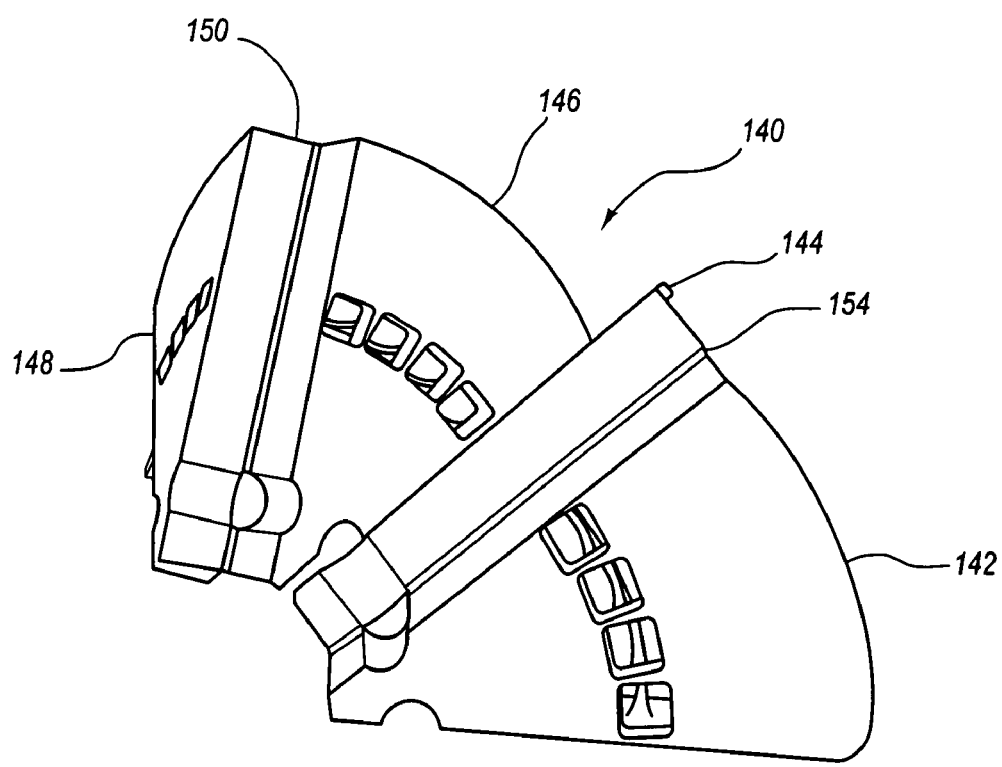
FIG. 6 is a perspective view of the exemplary collapsible fan holder illustrated in FIG. 3.

FIG. 6 is another perspective view of collapsible fan holder 140 and shows that an enlarged opening 171 may be formed between openings 170 and 172. Openings 170 and 171 may be large enough to allow a fastener, such as a bolt, to slip through openings 170 and 171 to be positioned in opening 172. Thus, openings 170 and 171 may allow a user to attach and remove collapsible fan holder 140 from turkey decoy body 101 without disassembling the fastener that attaches collapsible fan holder 140 to turkey decoy body 101. For example, if the fastener includes a nut and bolt, collapsible fan holder 140 may be detached from turkey decoy body 101 after loosening the nut but without completely removing the nut. Accordingly, openings 170 and 171 may allow a user to more quickly assemble and disassemble turkey decoy 100.

FIG. 6 also shows that collapsible fan holder 140 may fold at hinges 150, 152, and 154. Hinge 150 may allow a backside of first section 142 to fold towards a back side of second section 144. Similarly, hinge 152 may allow a front side of third section 146 to fold toward a front side of second section 144, and hinge 154 may allow a back side of fourth section 148 to fold toward a back side of third section 146.

Figure 7:
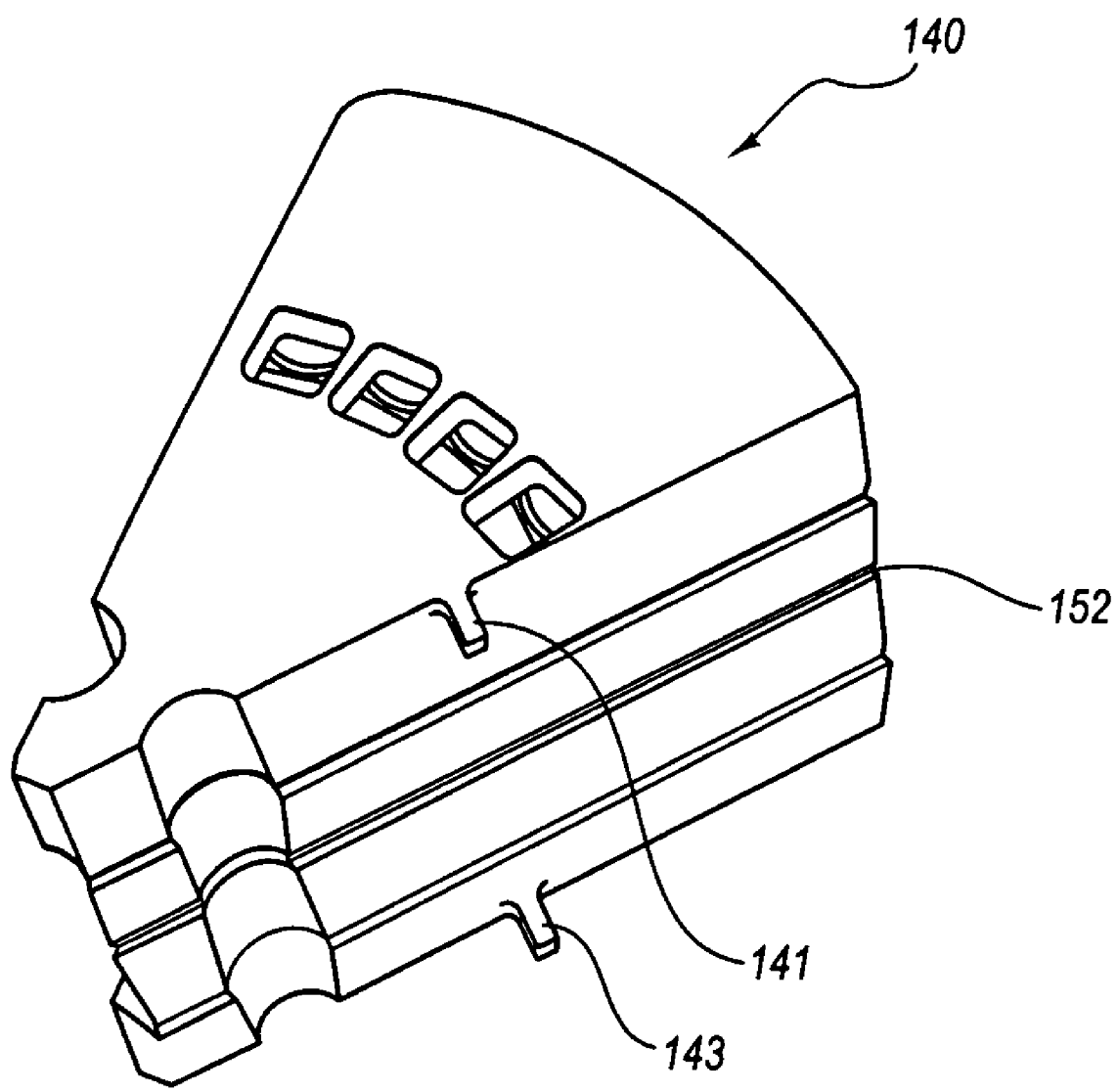
FIG. 7 is another perspective view of the exemplary collapsible fan holder illustrated in FIG. 3.

FIG. 7 shows a collapsible fan holder 140 in a collapsed position. When collapsible fan holder 140 is in a collapsed position, a back side of first section 142 may contact a back side of second section 144, a front side of second section 144 may contact a front side of third section 146, and a back side of third section 146 may contact a back side of fourth section 148. Collapsible fan holder 140 may also include tabs 141 and 143. A resilient retaining member (e.g., a rubber band) may hold collapsible fan holder 140 in the collapsed position, and tabs 141 and 143 may hold the resilient retaining member in place on the collapsible fan holder.

FIGS. 8A, 8B, and 8C illustrate inserting feather 130 into collapsible fan holder 140. As previously noted, feather retainer 160 may be designed to hold feathers such the vanes face a forward direction (the same direction the feathers face in a real turkey) rather than facing sideways. According to some embodiments, a feather retainer may guide a feather into a forward facing position if a user begins inserting the feather with the vane in a sideways orientation. For example, a user may begin to insert feather 130 into clip 164 with vane 132 in a sideways orientation, as illustrated in FIG. 8A. When the user presses feather 130 into clip 164, clip 164 may cause feather 130 to begin to rotate to a forward facing orientation, as illustrated in FIG. 8B. When the user finishes inserting feather 130 into feather retainer 160, feather 130 may finish rotating to a forward-facing orientation, as illustrated in FIG. 8C.

According to some embodiments, feather retainer 160 may be dimensioned to hold a feather in a forward-facing direction. As previously noted, feather retainer 160 may have dimensions that are similar to the dimensions of a real wild turkey feather. In some embodiments, clip 164 and opening 162 of feather retainer 160 may be rounded to conform to the rounded shape of a turkey feather quill.

Figure 9:
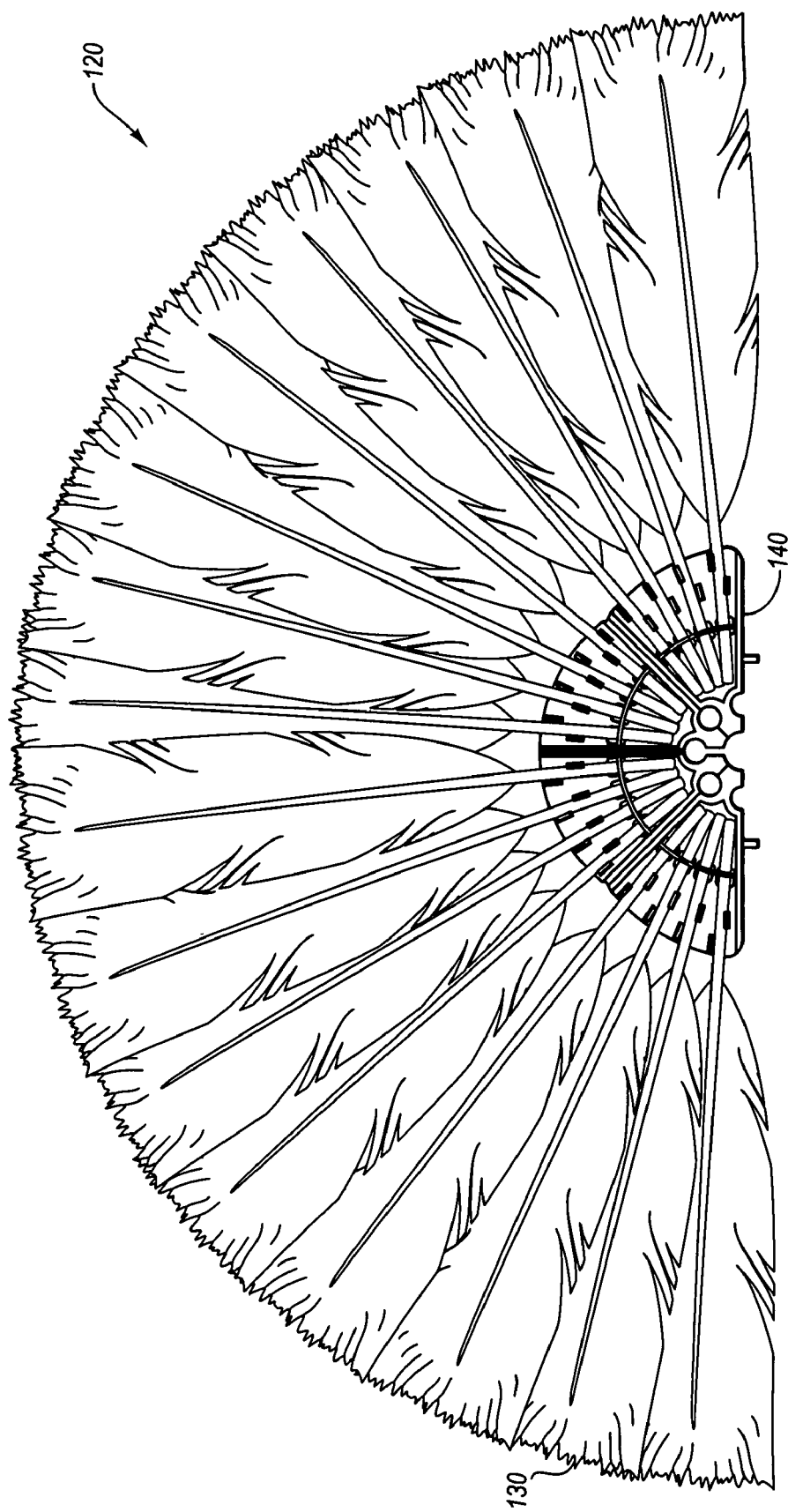
FIG. 9 is a back view of an exemplary turkey decoy fan according to certain embodiments.
Figure 10:
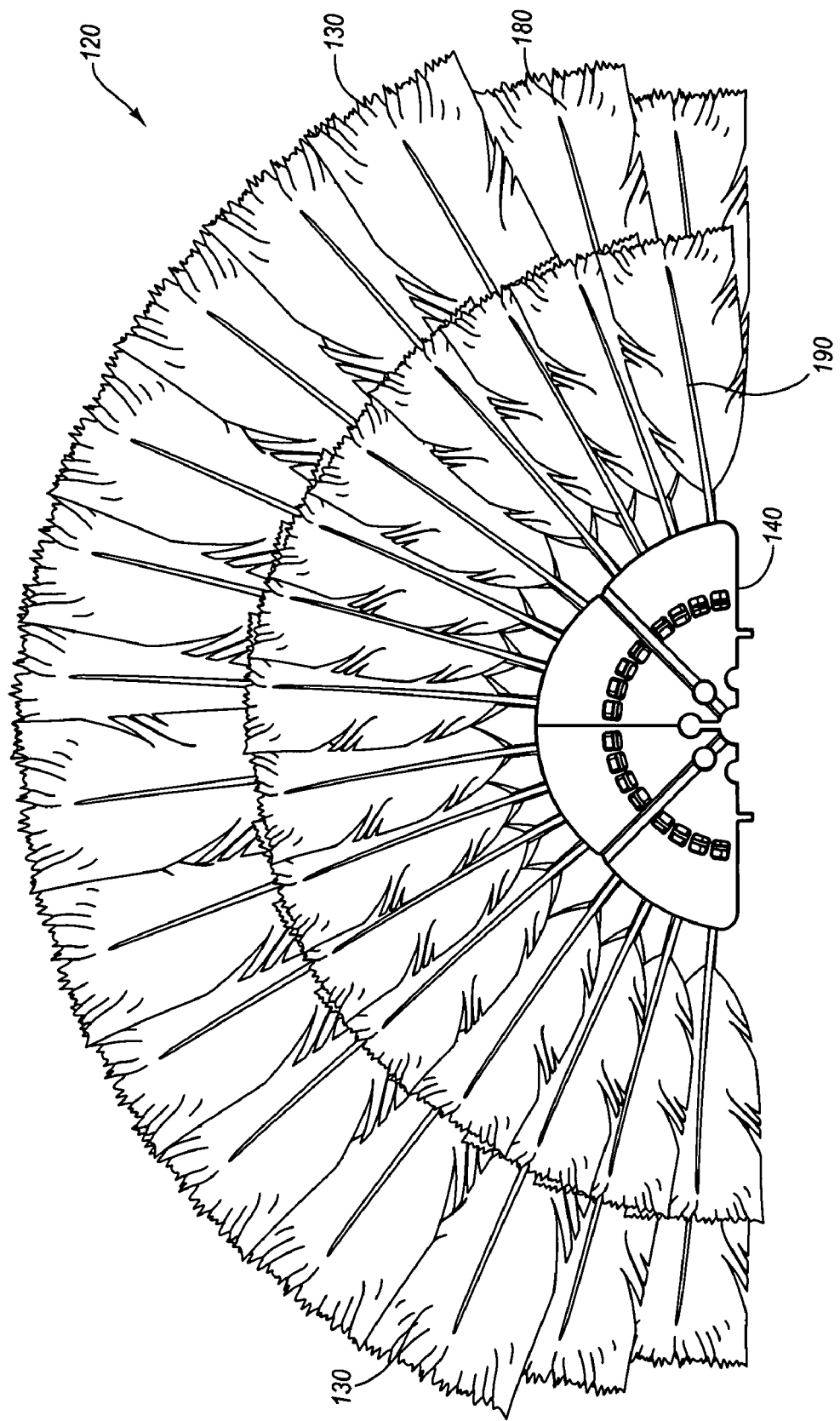
FIG. 10 is a front view of an exemplary turkey decoy fan according to certain embodiments.

FIG. 9 is a back view of fan 120 with turkey tail feathers (real or synthetic), such as primarily tail feathers 130, inserted into collapsible fan holder 140. As shown in FIG. 9, the feathers may be spaced to make fan 120 appear like a real gobbler fan. FIG. 10 is a front view of fan 120 with additional secondary tail feathers, such as tail feathers 190, attached to collapsible fan holder 140. In some embodiments, the secondary tail feathers may also be directly attached to the tall tail feathers. Secondary tail feathers 190 may be attached to fan 120 using glue, tape, or any other suitable fastener.

FIG. 10 also shows that smaller primary tail feathers 180 can be positioned and secured to the collapsible fan holder 140. Shorter tail feathers 180 simulate the appearance of a jake (i.e., an immature male turkey). A jake turkey decoy may cause a tom (a mature male turkey) to challenge the jake, thus drawing the tom into shooting range.

Figure 11:
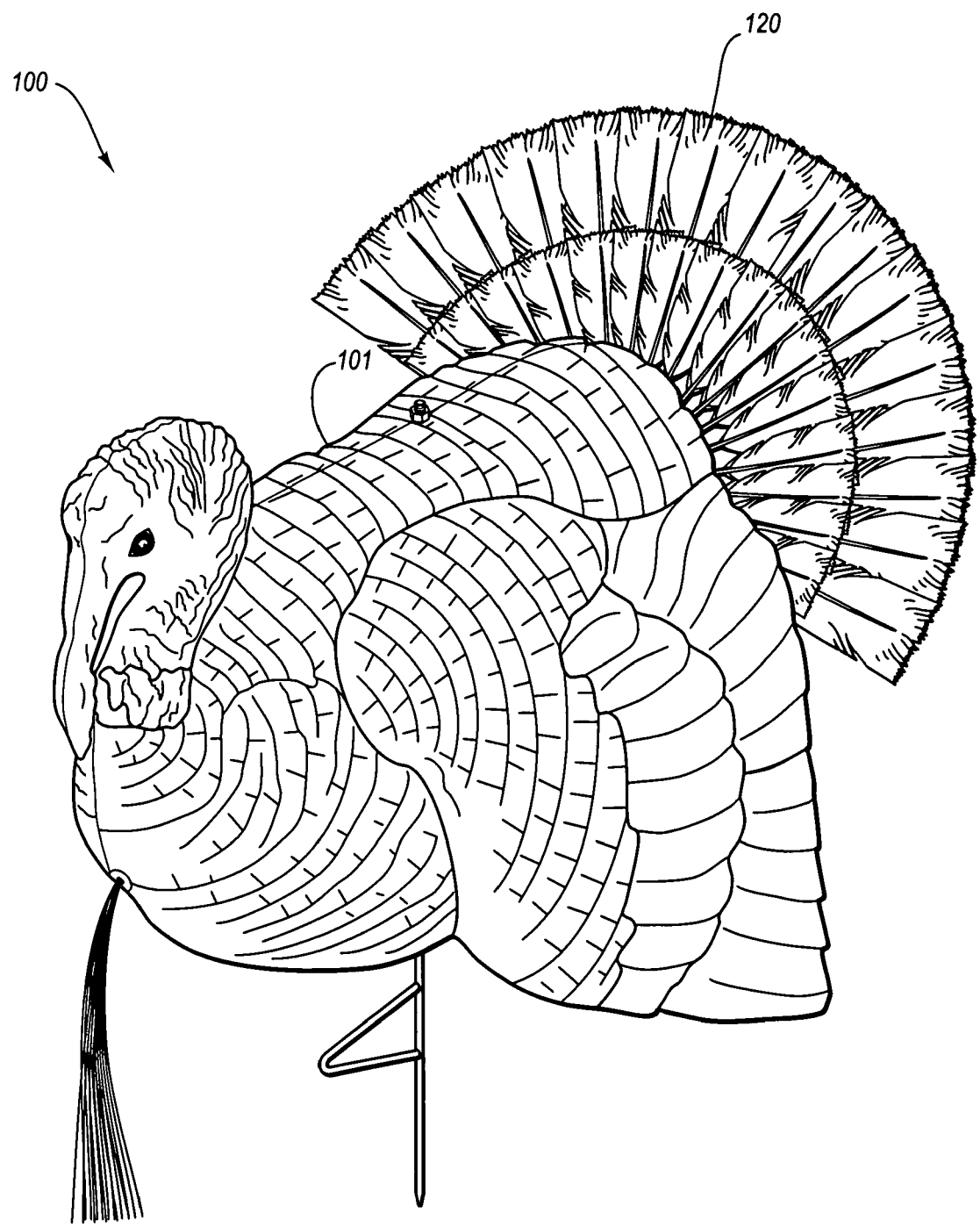
FIG. 11 is a perspective view of an exemplary turkey decoy according to certain embodiments.

FIG. 11 shows turkey decoy 100 with fan 120 leaning back (i.e., angling away) from turkey decoy body 101. Fan 120 may angle away from turkey decoy body 101 at various different angles. According to some embodiments, fan 120 may lean back from turkey decoy body 101 to create a more submissive appearance of turkey decoy 100. In at least one embodiment, turkey decoy 100 may comprise a special fastener that allows fan 120 to lean back at an angle (relative to vertical) from turkey decoy body 101. According to various embodiments, fan 120 may be attached to turkey decoy body 101 with a nut and bolt, and the nut may be loosened to allow fan 120 to lean back. Fan 120 may also be referred to as a feather assembly. A feather assembly may be any assembly of feathers suitable for use with a turkey decoy.

Figure 12:
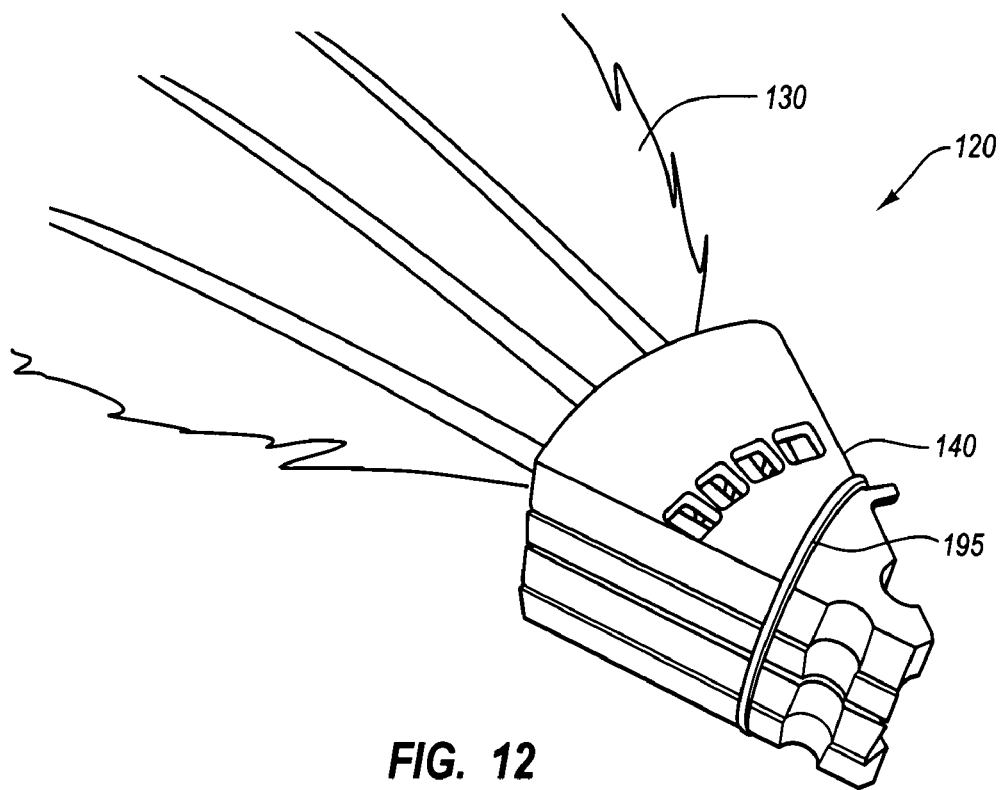
FIG. 12 is a perspective view of a collapsed turkey decoy fan according to certain embodiments.

FIG. 12 shows fan 120 in a collapsed position. A user may be able to quickly collapse fan 120 for transport. A resilient retaining member 195 (e.g., a rubber band) may hold fan 120 in a collapsed position. Collapsible fan holder 140 may allow fan 120 to be compact enough for carrying in a vest pocket or pack. Collapsible fan holder 140 may expand to look like a very realistic fan, particularly in embodiments where collapsible fan holder 140 includes real turkey feathers. Thus, collapsible fan holder 140 may help provide a portable, realistic turkey decoy.

Figure 13:
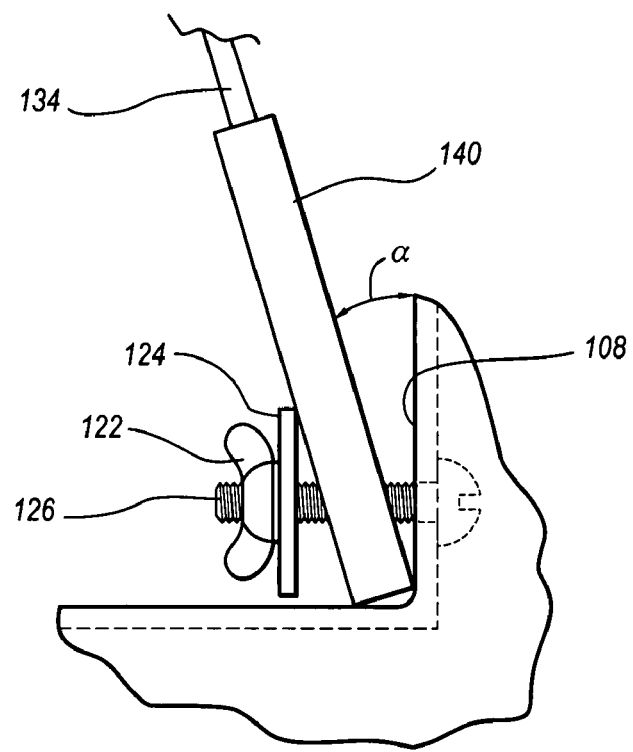
FIG. 13 is a partial side elevation view of an angled turkey fan relative to the body of the turkey decoy according to certain embodiments.

FIG. 13 shows the fan holder 140 at an angle $\alpha$ relative to a substantially vertical wall of the tail section 108. By rotating wing nut 126 relative to threaded bolt 126, the fan holder 140 along with feathers 134 can be laid back at an angle relative to the vertical. In other words, angle $\alpha$ can be changed in an infinitely variable manner between, for example, a substantially vertical position (e.g., approximately 90°) and an angled position that may be approximately 45° or less. Thus, the angle of the spread of tail feathers 140 can be adjusted between a full-strut or full-dominance position (i.e., substantially vertical) and a lower-profile or more submissive position (i.e., and angled position). This may allow for more effective uses of the turkey decoy.

Unless otherwise noted, the terms "a" or "an", as used in the specification and claims, are to be construed as meaning "at least one of." In addition, for ease of use, the words "including" and "having", as used in the specification and claims, are interchangeable with and have the same meaning as the word "comprising."

What is claimed is:

1. An apparatus comprising:
   a turkey decoy device comprising:
      a collapsible fan holder, the collapsible fan holder comprising:

a first section comprising a first plurality of feather retainers;
a second section comprising a second plurality of feather retainers;
a first hinge attaching the first section to the second section;
a third section comprising a third plurality of feather retainers;
a second hinge attaching the third section to the second section, wherein:
   the second hinge is configured to allow a front side of the third section to fold toward a front side of the second section, and
   the first hinge is configured to allow a back side of the first section to fold toward a back side of the second section;
a fourth section comprising a fourth plurality of feather retainers;
a third hinge attaching the fourth section to the third section, wherein the third hinge is configured to allow a back side of the fourth section to fold toward a back side of the third section;
wherein the collapsible fan holder is dimensioned to fold to a collapsed position with the back side of the first section contacting the back side of the second section, the front side of the second section contacting the front side of the third section, and the back side of the third section contacting the back side of the fourth section;
a resilient retaining member configured to hold the collapsible fan holder in the collapsed position, wherein the collapsible fan holder comprises:
   a first tab extending from the first section;
   a second tab extending from the fourth section, the first and second tabs being dimensioned to hold the resilient retaining member in place around the collapsible fan holder.

2. The apparatus of claim 1, wherein:
   each of the first, second, third, and fourth sections are generally triangular shaped;
   the collapsible fan holder is generally triangular shaped in a collapsed position;
   the collapsible fan holder is semi-circle shaped in an open position.

3. The apparatus of claim 1, wherein each of the first, second, third, and fourth sections comprises four feather retainers.

4. An apparatus comprising:
   a turkey decoy device comprising:
      a collapsible fan holder, the collapsible fan holder comprising:
         a first section comprising a first plurality of feather retainers;
         a second section comprising a second plurality of feather retainers;
         a first hinge attaching the first section to the second section;
         a washer dimensioned to hold the collapsible fan holder in an open position;
         a fastener configured to attach the collapsible fan holder and the washer to a turkey decoy body;
      wherein the collapsible fan holder further comprises an opening between the first and second sections, the opening being dimensioned to allow the collapsible fan holder to be attached to and detached from the turkey decoy body without disassembling the fastener.

5. The apparatus of claim 4, wherein the fastener is configured to adjust between a first position and a second position, the fastener being configured to hold the collapsible fan holder generally upright in the first position, the fastener being configured to allow the collapsible fan holder to angle away from the turkey decoy body in the second position.

* * * * *